United States Patent
Flokos

(10) Patent No.: US 11,296,893 B2
(45) Date of Patent: Apr. 5, 2022

(54) METHOD AND SYSTEM FOR IDENTITY VERIFICATION

(71) Applicant: Konstantinos Flokos, Ilioupoli (GR)

(72) Inventor: Konstantinos Flokos, Ilioupoli (GR)

( * ) Notice: Subject to any disclaimer, the term of this patent is extended or adjusted under 35 U.S.C. 154(b) by 185 days.

(21) Appl. No.: 16/746,930

(22) Filed: Jan. 19, 2020

(65) Prior Publication Data

US 2020/0235944 A1  Jul. 23, 2020

Related U.S. Application Data

(60) Provisional application No. 62/793,908, filed on Jan. 18, 2019.

(51) Int. Cl.
| | | |
|---|---|---|
| *H04L 9/32* | (2006.01) | |
| *G06F 21/45* | (2013.01) | |
| *H04L 29/06* | (2006.01) | |
| *H04W 12/069* | (2021.01) | |

(52) U.S. Cl.
CPC ............ *H04L 9/3263* (2013.01); *G06F 21/45* (2013.01); *H04L 63/0823* (2013.01); *H04L 63/102* (2013.01); *H04W 12/069* (2021.01)

(58) Field of Classification Search
None
See application file for complete search history.

(56) References Cited

U.S. PATENT DOCUMENTS

| | | | | |
|---|---|---|---|---|
| 10,701,067 | B1 * | 6/2020 | Ziraknejad | .......... G06F 21/6209 |
| 2012/0324242 | A1 * | 12/2012 | Kirsch | ................ G06F 21/6245 |
| | | | | 713/189 |

* cited by examiner

*Primary Examiner* — Brandon Hoffman

(57) ABSTRACT

A method for verifying the identity of a new user, the method comprising providing a Certification Authority platform that is accessible via the internet. The platform receives an identity verification request of the new user and requests the new user to enter the user's full name and at least one other personal identity data. The platform may then identify at least two already verified users in the proximity of the new user, and ask the existing verified users to vouch for the complete list of the personal identity data of the new user. The existing verified users may then vouch for the new user and the platform makes the new user a verified user and generates a digital certificate.

17 Claims, 1 Drawing Sheet

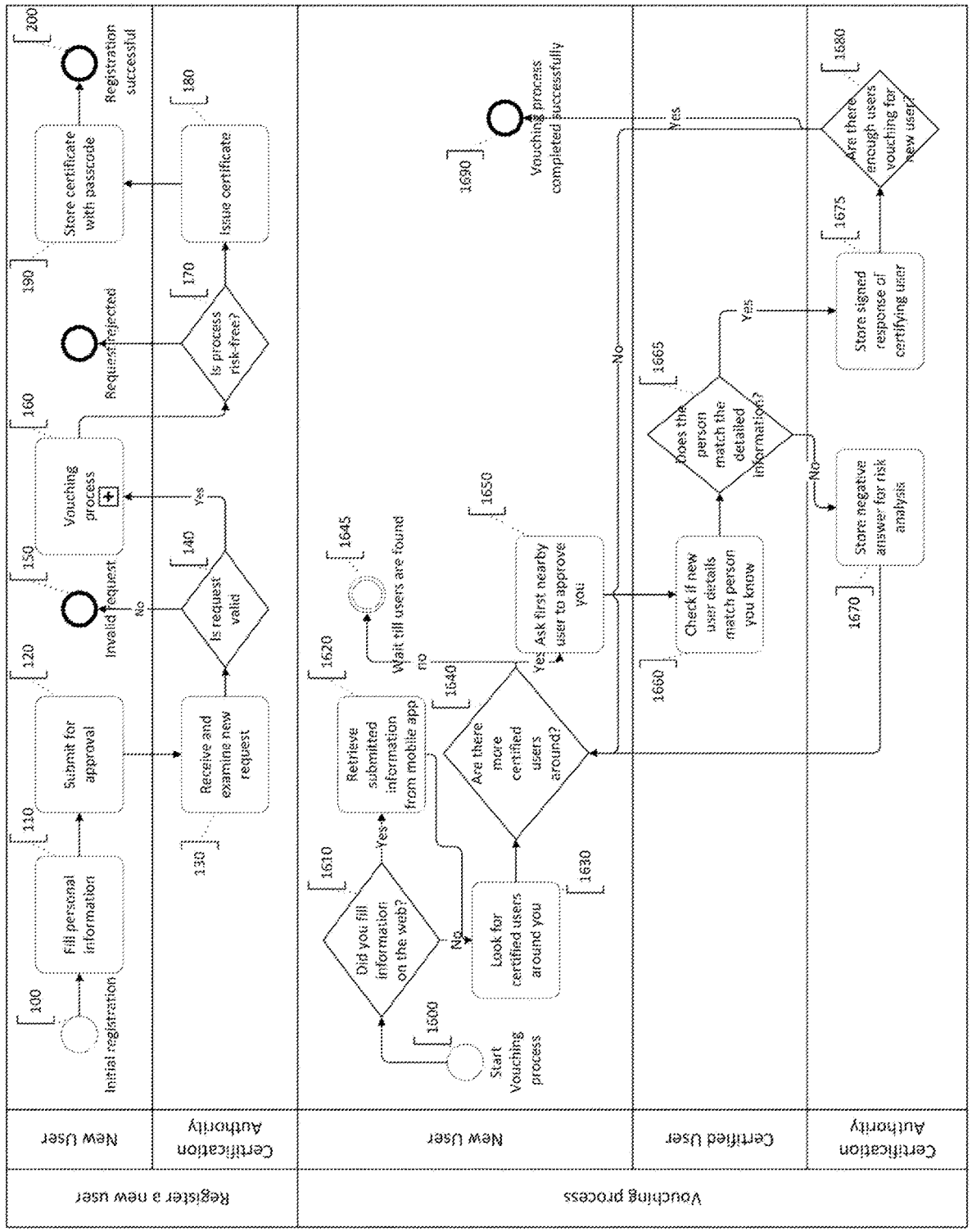

METHOD AND SYSTEM FOR IDENTITY VERIFICATION

CROSS-REFERENCE TO RELATED APPLICATIONS

The present application claims priority from U.S. provisional application No. 62/793,908 filed on Jan. 18, 2019 with the US patent office and which is incorporated herein by reference in its entirety for all purposes.

FIELD OF THE INVENTION

The present invention relates generally to the field of online identity verification.

BACKGROUND

The need for a fast and accurate identity verification system is proven by the necessity to accurately identify the user of services/products which are either regulated (like banking, telecoms, etc.) or may be harmful for the society overall.

Identity verification is often carried out based on official documents delivered by a few well acknowledged entities— frequently state owned, like the police, ministry of interior, etc. In some countries though either those entities do not issue official documents for the identity of a person or the documents themselves are easily tampered.

Also, in most countries, official identity documents are issued to adults or persons of at least 12 years old, leaving underage without a concise electronic identity.

Additionally, many refugees from countries in war leave their land in urgency, leaving behind official documents; in many of those cases, it may not be possible to re-issue them from abroad creating a huge problem of identity verification for those people in the countries they visit.

Although reliable remote internet-based identity verification systems are also known, these systems may not be used when the user does not possess official documents or it is difficult to match the official document with the person (e.g. due to outdated photographs, faded-out information, etc.).

Although governments globally try to harmonize the state-issued official identity documents, this is not yet achieved globally.

There exists, therefore, a need for an alternative identity verification system and method that may be used when other methods fail, are not used or are not reliable enough.

SUMMARY OF THE INVENTION

The present invention provides a system and method of identity verification of a user that is not covered by existing systems. The present invention system and method may be used online but the invention is not limited in this way. For example, in an embodiment, the identity proof may be embedded in a smart-card such as a bank-card type and used wherever identity proof is required.

According to an embodiment of the present invention system and method, once the identity of a user is verified the system issues a digital identity certificate. The digital identity certificate may be similar to the one issued by a governmental agency; the certificate may be secured with a user-provided passcode (such as a pincode or password) and it can then be used by the user anywhere may be requested. For example, the digital identity certificate may be used to sign in one or more internet-based services that require personal information that has already been verified by the system and forms part of the digital verification certificate.

In an embodiment, the present invention system employs a Certification Authority (CA) platform (also referred to hereinafter simply as the platform) operatively linked to the cloud and mobile technologies. In an embodiment, the user may use a mobile application to connect to the platform for issuing the digital identity certificate, for storing the digital identity certificate and for accessing it as may be needed using the passcode. In another embodiment, the user may employ a web-based solution to perform those tasks.

According to an embodiment of the present invention an initial verification of the identity of a new user includes verification by at least two, preferably three or more, users with a valid electronic identity, issued by a government agency, who can vouch personally for the integrity of the personal information provided by the new user. The digital certificates of the individuals who confirmed the identity of the new user, may be included in the digital certificate of the new user.

In another embodiment, the initial process of identity proofing may be initiated on the web or using a mobile device. The new user introduces the claimed personal information in a form that is then submitted to the system for validation. The system, after performing some initial validations to exclude non-appropriate use of the process, stores the information and waits for already certified users to vouch for the entered information. Those last should use a mobile device with a provided mobile application to approve or disapprove the claimed personal information of the new user. If the number of persons vouching for the new user reaches the required level, the new identity is proven and created in the system.

In another embodiment, the system may be used to check the validity of the digital certificate of a user who used the present inventive method of identity proofing. The validation may control the expiration date of all involved certificates, including the ones used to prove the identity of the user.

The inventive platform may use a combination of Artificial Intelligence, Data Analysis and Big Data algorithms to accurately evaluate the risk related to the user's identity being compromised. The system may log every operation performed by the user and may use it for an immediate or future evaluation of the possibility of fraud. Also, by using a special algorithm the system can check the frequency of operations against known limits and patterns, check operations between different users who are either related or in the same geographical location, etc. If the evaluated risk is high enough, then the examined digital certificate is revoked, and the certificates used to prove it are promoted to a higher risk—eventually contacting their certification authority with a relevant revocation request.

BRIEF DESCRIPTION OF THE DRAWINGS

These and other features and advantages of the present invention will become apparent to those skilled in the art to which the present invention pertains from the following detailed description of specific embodiments of the invention in reference with the following FIGURE:

FIG. 1 is a Business Process Modelling Notation (BPMN) diagram of a method for verifying the identity of a user according to an embodiment of the invention.

DETAILED DESCRIPTION OF THE INVENTION

Various embodiments of the present invention are described below in more detail. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the various aspects and features of the present invention to those skilled in the art to which this invention pertains.

It will be further understood that the terms "comprises," "comprising," "includes," and "including" when used in this specification, specify the presence of the stated elements and do not preclude the presence or addition of one or more other elements.

It is also noted, that in some instances, as would be apparent to those skilled in the relevant art, a feature or element described in connection with one embodiment may be used singly or in combination with other features or elements of another embodiment, unless otherwise specifically indicate.

The present invention provides a method and system for the fast, reliable and accurate identity verification of a new user of an internet service. Once the identity of a new user is verified the system may issue a digital certificate that can be used in the future by the user to sign in to the internet service. The digital certificate may also be used by the user for signing to other internet services requiring at least one of the personal information that is verified by the digital certificate. Identity verification may include verifying at least one of a name (e.g., first and last name), age (e.g., exact date of birth including day, month, and year, or year only, or whether the user is over a certain age, for instance whether the user is an adult or a minor), physical characteristics (e.g., height, weight, hair color, eye color and the like), professional characteristics (e.g. profession, income, company), address (home or work address), family status (e.g., single, married, divorced, number of children) of the new user etc.

Referring now to FIG. 1 a method for the verification of a new user, according to an embodiment, may include the following steps. In step 100, the identity verification platform may receive a new user verification request. The platform may then request the user to provide certain personal data in step 110. For example, the new user may seek identity certification by introducing personal data about his identity which are requested by the platform in a digital form. The platform may prompt the user to enter the personal data to be verified. The personal data may include any of the personal data discussed above. For example, the system may request the user to enter the name, age, and the address of the user. The platform may also request additional data for performing the verification of the personal data of the new user. For example, in an embodiment, the platform may request a digital image or video of the new user.

The new user may access the platform to fill in initial personal information via any suitable method including, for example, a personal computer, a smart phone, a mobile or a like device which may have access to the platform via the web, a local network and the like. In step 120, after filling in the data, the user submits it to the platform for prior verification.

In step 130, the platform (in its ability as a formal Certification Authority (CA) according to RFC5280 (https://datatracker.ietf.org/doc/rfc5280)) receives the request from the user in the form of plain data fields. During this step an initial verification is performed, for faulty, repeated, difficult to treat data.

If the verification fails at step 140, the user is informed at step 150 and stops the process.

Otherwise, the process starts at step 160, to find other users in the proximity of the user to approve (vouch for) his claims. More details of this step follow:

At step 1600, the vouching process for the new user starts. If the user has introduced the information on the web or other non-mobile application method, at step 1620, a mechanism is proposed to let him bring this information to the mobile application. Example methods to be employed include a QR Code shown on the web interface of the user, which is then scanned by the mobile application and all stored information is entered in the mobile. In reality that involves linking the information submitted by the user to the CA with the mobile application. The mobile application may be used to prove the user's identity, for example, the system may employ the mobile application to ensure that the new user and the approver are in the same location, or next to each other, using the respective mobile applications in their smart phones. The mobile application may further store the new certificate in the local mobile vault and retrieve it when asked.

Assuming the personal information submitted to the Certification Authority is linked with the mobile application of the user, at step 1630 the user should start looking for other certified users willing to approve his claims. Typically, these may be users in the family of the user or close relatives. Those users should have a similar mobile application installed in their mobile device and link their digital certificate with it. The application may be provided by a governmental agency or another party authorized to play this role.

Alternatively, using Artificial Intelligence with primary criteria the current location of the new user, name details, age, address, etc. the platform may identify an already verified user who is in the proximity of the new user who may vouch for the accuracy of the claimed personal data of the new user and take responsibility for it. In an embodiment, the platform will always inform the user vouching for a new user about the importance of the action and—depending on the locality of the user (e.g. state or country where the user resides)—include legal requirements that the verifier reads and acknowledges to ensure that the verifier who vouches for the identity of the new user does not simply press a button, but accepts that in case of fraud he or she may face legal action.

For another example, the existing verified user may be a coworker of the new user that the system can identify based on the work information the new user may enter such as name of company and work location.

At step 1640, if the system cannot identify any existing verified user in the proximity of the new user who can vouch for the new user then the new user may wait till such users are found in his or her proximity (step 1650).

If at step 1640 one or more potential users to approve are found, the platform will provide them to the new user. Then, the new user may select one of the suggested existing verified users and may request him or her to approve his or her data. The verification request may be issued, for example, by asking the existing user to scan a QR Code presented on the screen of the new user (step 1650). In any case, the two users must meet face-to-face (be physically located next to each other) for the approval to succeed. The system may employ technological checks to ensure the location of both mobile devices match, i.e., that the requester and the approver are physically next to each other, before accepting any positive answer by the verifying user.

In step 1660, the existing verified user checks the details of the new user as presented by the platform. The verified user may make sure that the data presented to him correspond to the new user in front of him. The verified user (taking the responsibility of the verification for the new user) may request supplementary information from the new user to be certain for his decision. If the decision is positive, the system requires that the verified user accepts a legal notice taking legal responsibility of the decision, before confirming his choice.

If at step 1665, the verified user does not agree to approve the claimed information from the new user, this response is stored in the platform and may be used for risk analysis in the following steps of the process (Step 1670). After that, the new user is obliged to find other verified users willing to approve his or her request, leading the process to step 1640.

Otherwise, the verified user vouched for the new user's personal information and the system stores his or her signed response (step 1675). Depending on the actual mobile application used, the verified user may be asked to provide the passcode used to secure the personal certificate he or she is related with.

Assuming the number of required by the system successful approvals for this new user has not been reached at step 1680, the new user continues finding more verified users to vouch for him or her (step 1640).

Otherwise, the vouching process is complete (at step 1690) and the control returns to step 170. During this step, the Certification Authority examines all the elements of the process and decides using Artificial Intelligence whether to approve the new user or not. All known elements are taken into account, including the details of the new user, the vouching users, the environment the process took place, as well as previous interactions of all involved parties. To avoid repetitive fraudulent activities, the number of times one user may vouch for new users may be limited to a small number, such as, for example, 3, 4, or 5 times. In an embodiment, additionally, users that have been previously verified using this innovative method may be prohibited from vouching for other users. Those and other parameters may be relaxed or tightened, depending on the location, the locality requirements (e.g., national requirements), the nationality or other attributes of the involved parties.

If the step 170 is not successful, the request of the new user is rejected, and the user is informed accordingly.

Otherwise, a new certificate is issued at step 180 signed by the Certification Authority. In this certificate, the identifiers of the certificates of the vouching users are included, so that they can be used when checks for revocation are performed.

The new certificate is returned to the calling mobile application of the new user who stores it in the mobile device for further usage (step 190). Typically, this certificate is protected with a passcode, only known to the user. At this stage the process is considered successfully terminated (step 200).

Alternatively, in an embodiment, the new user may be asked to secure the new digital identity by providing biometric information such as a fingerprint, or a picture of their hand, iris, face etc.

A platform verified user can then prove his identity by using the digital certificate which can be unlocked with the biometrical information or the passcode selected during storage. On any online service that requires a digital certificate, the user can supply its public part (public certificate) at will or use the private part (private certificate) after unlocking it, in order to sign or encrypt data, connections or whatever is needed. The counterparty which receives the public part of the certificate has the right (if not the obligation) to make sure that the certificate is still valid. Apart from a basic check on the validity of the certificate and the expiration date, an online check using an appropriate protocol (such as OSCP or CRL) may be performed. The Certification Authority proposed (part of the invented solution) will receive that request and respond appropriately. In an additional embodiment, the proposed CA will use additional checks to confirm that the requested certificate is still valid. By retrieving the list of verified certificates, the new CA may revoke a certificate if one of the verified certificates is revoked—even though the certificates in the certification chain are still active. Additionally, the new CA may use Artificial Intelligence in order to evaluate the current validity of the certificate, performing a new risk analysis, similar to the one performed during the initial user registration (step 170).

Although the invention has been described with specific embodiments it should be understood that many other embodiments may be envisaged by those skilled in the art to which the present invention pertains without departing from the scope or spirit of the present invention as defined by the following claims.

What is claimed is:

1. A method for verifying the identity of a new user, the method comprising:
   providing a Certification Authority platform that is accessible via the internet;
   the platform receiving an initial identity verification request of the new user from an electronic device of the new user, the request including the user's full name and at least one other personal identity data retrieved from the electronic device of the new user;
   the platform searching and identifying at least two existing verified users in a face-to-face distance from the new user by locating the position of an electronic device of each of the at least two existing verified users;
   the platform sending to the electronic devices of the at least two existing verified users the identity verification request to vouch for the full name and the at least one other personal identity data of the new user;
   the platform receiving a positive verification of the full name and the at least one other personal identity data of the new user by the at least two existing verified users from their respective electronic devices;
   the platform, upon receiving the positive verification, registering the new user as a verified user and generating a digital identity certificate for the new user with the full name of the new user, the at least one other personal identity data of the new user, and an identifier for each of the at least two existing verified users; and
   the platform sending the digital identity certificate to the electronic device of the new user.

2. The method of claim 1, further comprising the digital identity certificate being retrieved by an internet web site from the electronic device of the new user for allowing access to an internet service to the new user, and
   wherein the at least one other personal identity data includes an age, a date of birth, a place of birth, a photograph, a video, a nationality, an email address, a current address, or a current occupation of the new user.

3. The method of claim 1,
   wherein the new user issues the initial identity verification request to the platform through a mobile application installed in the electronic device of the new user which is operably connected to the platform, and wherein the at least two existing verified users receive the verification request from the platform in the same mobile application installed in their respective electronic devices.

4. The method of claim 3, further comprising:
the platform evaluating the validity of the issued digital identity certificate of the new user periodically;
the platform revoking the digital identity certificate based on the validity evaluation;
the platform identifying the digital identity certificates of the at least two existing verified users who verified the identity of the new user whose digital identity certificate is revoked; and
the platform elevating a validity risk for the digital identity certificates of said at least two existing verified users.

5. The method of claim 1, further comprising, before the platform can accept the verification confirmation from each of the at least two existing verified users, the platform issuing a notice to each one of the at least two existing verified users via the mobile application on their electronic devices of the of the legal liability associated with a dishonest confirmation, and requesting each of the at least two existing verified users to sign online the notice.

6. The method of claim 1, further comprising,
a plurality of fraud prevention operations including:
the platform checking the total number of times each one of the at least two existing verified users has been used for the verification of others before issuing the identity verification request, and only issuing the identity verification request if the total number is less or equal than a predetermined number in order to prevent fraudulent activity;
the platform revoking the digital identity certificate of the new user if any one of the at least two existing verified users that vouched for the full name and the at least one other personal data of the new user is identified as suspect of fraudulent activity.

7. The method of claim 4, further comprising, when the new user becomes a verified user, the mobile application requesting the new user to provide at least one of a biometric information and a passcode for providing future access to the digital identity certificate when needed.

8. The method of claim 7, wherein the platform generates a private digital identity certificate that is locked using the at least one of the biometric information and the passcode provided by the new verified user and stores the private digital identity certificate in a secure store along with the identifiers of the at least two existing verified users who confirmed the identity of the new user for allowing the platform to check and identify a fraudulent verification.

9. The method of claim 1, wherein the platform checks to ensure that the at least two existing verified users are physically next to each other with the new user at the time when each of them vouches for the full name and the at least one other personal identity data of the new user.

10. The method of claim 1, wherein the new user is a refugee lacking at least one identity document.

11. The method of claim 10, wherein prior to the issuance of the digital identity certificate for the new user, the platform confirms that the at least two existing verified users are subject to the jurisdiction of the locality wherein the identity verification of the new user is taking place.

12. The method of claim 1, wherein the internet web site is a government site.

13. The method of claim 2, wherein the internet web site requires that the new user is an adult and the at least one other personal identity data of the new user is at least one of an age, a birth date, or adult status of the new user, and wherein the web site retrieves the digital certificate from the electronic device of the new user for proving the user's age and authorizing the new user to access the web site.

14. A system for verifying the identity of a new user of the system, the system comprising:
a certification authority platform, the certification platform being configured to:
receive an initial identity verification request of the new user from an electronic device of the new user, the request including the user's full name and at least one other personal identity data retrieved from the electronic device of the new user;
searching and identifying at least two existing verified users in a face-to-face distance from the new user by locating the position of an electronic device of each of the at least two existing verified users;
sending to the electronic devices of the at least two existing verified users the identity verification request to vouch for the full name and the at least one other personal identity data of the new user;
receiving a positive verification of the full name and the at least one other personal identity data of the new user by the at least two existing verified users from their respective electronic devices;
upon receiving the positive verification, registering the new user as a verified user and generating a digital identity certificate for the new user with the full name of the new user, the at least one other personal identity data of the new user, and an identifier for each of the at least two existing verified users;
sending the digital identity certificate to the electronic device of the new user.

15. The system of claim 14, further comprising:
a first mobile application installed in the electronic device of the new user,
a second mobile application installed in the electronic devices of the at least two existing verified users of the system,
wherein the first and second mobile applications are the same mobile applications and are operably connected with the platform via a network including the world wide web, and
wherein the electronic devices of the new user and of the at least two existing verified users are one of a smart phone, a tablet, a lap top, or a desk top computer, and
wherein the platform further comprises means for checking whether each of the at least two existing verified users is in a face-to-face distance from the new user when their respective verification confirmation is sent to the platform for verifying the full name and the other personal identity data of the new user, and if the face-to-face distance is not confirmed the platform rejecting the verification confirmation.

16. The system of claim 15, wherein face-to-face distance means physical proximity,
and wherein the means for verifying the physical proximity includes a global positioning system capability.

17. The system of claim 15, wherein the platform is further configured to:
evaluating the validity of the issued digital identity certificate of the new user periodically;
revoking the digital identity certificate based on the validity evaluation;

identifying the digital identity certificates of the at least two existing verified users who verified the identity of the new user whose digital identity certificate is revoked; and elevating a validity risk for the digital identity certificates of said at least two existing verified users.

* * * * *